United States Patent [19]

Masumoto et al.

[11] Patent Number: 5,777,511
[45] Date of Patent: Jul. 7, 1998

[54] DATA DEMODULATION APPARATUS

[75] Inventors: Takahiko Masumoto, Gunma-ken; Kazuhiro Kimura, Fukaya; Hiroshi Kaneko, Gunma-ken, all of Japan

[73] Assignee: Sanyo Electric Co., Ltd., Osaka, Japan

[21] Appl. No.: 840,477

[22] Filed: Apr. 21, 1997

[30] Foreign Application Priority Data

Apr. 22, 1996 [JP] Japan ................................ 8-100368

[51] Int. Cl.$^6$ .............................. H03D 3/00; H04L 27/22
[52] U.S. Cl. ........................ 329/304; 329/310; 375/324; 375/329; 375/342; 375/350
[58] Field of Search .................................. 329/304–301; 375/324, 326, 329–333, 342, 346, 350–351

[56] References Cited

U.S. PATENT DOCUMENTS 5,243,299  9/1993  Marchetto et al. .............. 329/300
5,436,591  7/1995  Henze ............................ 329/304

*Primary Examiner*—David Mis
*Attorney, Agent, or Firm*—Loeb & Loeb LLP

[57] ABSTRACT

A digital modulating signal, which is a binary conversion of an RDS signal by a comparator, is sampled by a D-FF with a regeneration clock synchronized with a carrier regenerated by a carrier regeneration circuit. Next, a comparator output is input by an edge detection circuit where a data edge is detected, and the edge interval between this edge and the sampling timing edge of the regeneration clock is detected by a reliability judgment circuit where the edge interval is encoded and output as reliability data. Then, the reliability data is added as LSB data to various sampling data, and data for various symbols is regenerated at the data regeneration circuit. This minimizes the influence of the error data on the data regeneration circuit even if data is sampled erroneously.

6 Claims, 5 Drawing Sheets

| SAMPLING DATA | RELIABILITY DATA | CONVERSION RESULT |
|---|---|---|
| 0 | 0 | 0 1 |
| 0 | 1 | 0 0 |
| 1 | 0 | 1 0 |
| 1 | 1 | 1 1 |

Fig. 5

| SAMPLING DATA | RELIABILITY DATA | CONVERSION RESULT |
|---|---|---|
| 0 | 0 0 | 0 1 1 |
| 0 | 0 1 | 0 1 0 |
| 0 | 1 0 | 0 0 1 |
| 0 | 1 1 | 0 0 0 |
| 1 | 0 0 | 1 0 0 |
| 1 | 0 1 | 1 0 1 |
| 1 | 1 0 | 1 1 0 |
| 1 | 1 1 | 1 1 1 |

Fig. 6

| SAMPLING DATA | RELIABILITY DATA | CONVERSION RESULT |
|---|---|---|
| 0 | 1 1 | 0 1 1 |
| 0 | 1 0 | 0 1 0 |
| 0 | 0 1 | 0 0 1 |
| 0 | 0 0 | 0 0 0 |
| 1 | 1 1 | 1 0 0 |
| 1 | 1 0 | 1 0 1 |
| 1 | 0 1 | 1 1 0 |
| 1 | 0 0 | 1 1 1 |

Fig. 7

DATA DEMODULATION APPARATUS

BACKGROUND OF THE INVENTION

1. Field of the Invention

The present invention relates to an apparatus for demodulating signals, such as Radio Data System (RDS) broadcast signals, which are a predetermined carrier wave modulated with digital data.

2. Description of the Prior Art

In general, the known methods for the demodulation of signals that have been modulated using binary phase-shift keying (BPSK) include synchronous detection and delayed detection. When performing synchronous detection through digital signal processing, a known method performs data reproduction by sampling input signals through the use of reproduced carrier wave signals.

This method will be described using FIG. 1. An input modulated signal is supplied to a comparator 2 and converted to a bit stream of 0's and 1's. The output of the comparator is both supplied to a carrier regeneration circuit 3 comprising a Costas loop and sampled at a sampling clock of a carrier period, which was regenerated by carrier regeneration circuit 3, in a D-FF 4. The data which uses the carrier period obtained in this manner as one time slot is input by a data regeneration circuit 7 and the data of the various symbols is demodulated. At the data regeneration circuit 7, the data regeneration timing of the symbol period is detected and the various symbols are regenerated at this timing.

The signal waveforms given in FIG. 2 will be described. The PSK modulated data has a waveform such as (a) and a signal such as (b) is output from the comparator 2. When the comparator output is sampled at sampling clock (c), which was regenerated by carrier regeneration circuit 3, the data shown in (d) is obtained. Signal (d) is supplied to data regeneration circuit 7 and the data (f) of the various symbols is regenerated at the detected data regeneration timing (e).

In the circuit of the prior art, if the sampling clock that is regenerated by the carrier regeneration circuit deviates from a proper timing or if a noise component is superimposed on the input signal to change the phase of the modulating signal, the data at the sampling timing may differ from the signal that should exist (the data may be inverted for one-bit data). In particular, for an RDS signal, if an ARI signal (Automatic Radio Information) is multiplexed (the ARI signal is multiplexed with a phase relationship of 90 degrees on the same carrier frequency as the RDS signal), a problem also occurs where the phase component of the digital modulating signal varies with the symbol period from the ARI signal.

Since the data may be erroneously sampled in this manner, the removal of noise components through appropriate signal processing at the data regeneration circuit is essential. However, if the data becomes inverted for the above-mentioned reason, there are limits to its effect.

SUMMARY OF THE INVENTION

Even in cases where the data is in error due to such causes as deviation in sampling timing or phase changes in the modulating signal, the sampling timing is often at a delicate position near the edge of data so the data may possibly be erroneously sampled. If, as shown in FIG. 4, the phase of an input modulating signal (a) changes due to noise and deviates from a sampling phase (c) with the sampling phase by 90 degrees of one cycle of a regenerated carrier (b), and when a comparator output (d) is sampled, the data may be erroneously sampled at times t0, t1, and t2 in a sampling output (e). The deviation between the leading edge timing of sampling clock (c), which is the sampling timing, and the edge timing (f) of the data from comparator is detected and the magnitude of this interval is encoded. Assuming, for example, that the larger the interval, the higher the reliability of the sampled data, the interval is supplied together with the sampling data to the data regeneration circuit. A narrow timing interval indicates that the sampling phase is delicate and it is highly possible the data has been erroneously sampled, thus, the reliability of the sampling data may be considered to be low. Conversely, if the timing interval is wide, the reliability of the sampling data may be considered to be high.

Accordingly, the demodulation performance in the present invention is improved by detecting the edge of the data from the modulating signal, detecting the relative timing deviation between the edge timing and the sampling timing to newly create reliability data indicating the reliability of the various sampling data, and adding the reliability data to the various sampling data as LSB data to regenerate data for various symbols.

In this manner, the present invention enables data for the various symbols to be regenerated while placing importance on data having high reliability in the data regeneration circuit by obtaining reliability data for each sampling data. Thus, if data was inverted due to erroneous sampling, its influence can be minimized. In other words, even if the sampling data erroneously becomes 0, for example, the data can be processed in terms of a level close to 1 as long as the data edge and sampling timing are adjacent, thus enabling the influence of this sort of erroneous data on the data regeneration circuit to be minimized.

BRIEF DESCRIPTION OF THE DRAWINGS

FIG. 5 shows conversion results of sampling data using reliability data.

FIG. 6 and FIG. 7 show conversion results of sampling data using multiple-bit reliability data.

DETAILED DESCRIPTION OF THE PREFERRED EMBODIMENTS

Figure 1:
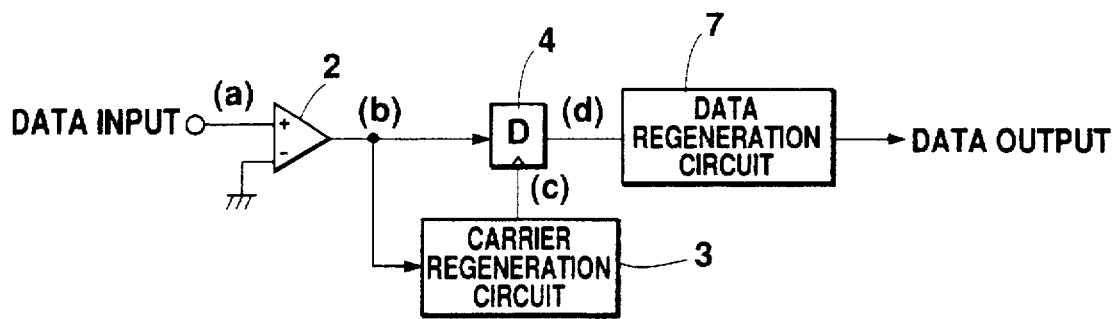
FIG. 1 is a block diagram of a prior art example.
Figure 2:
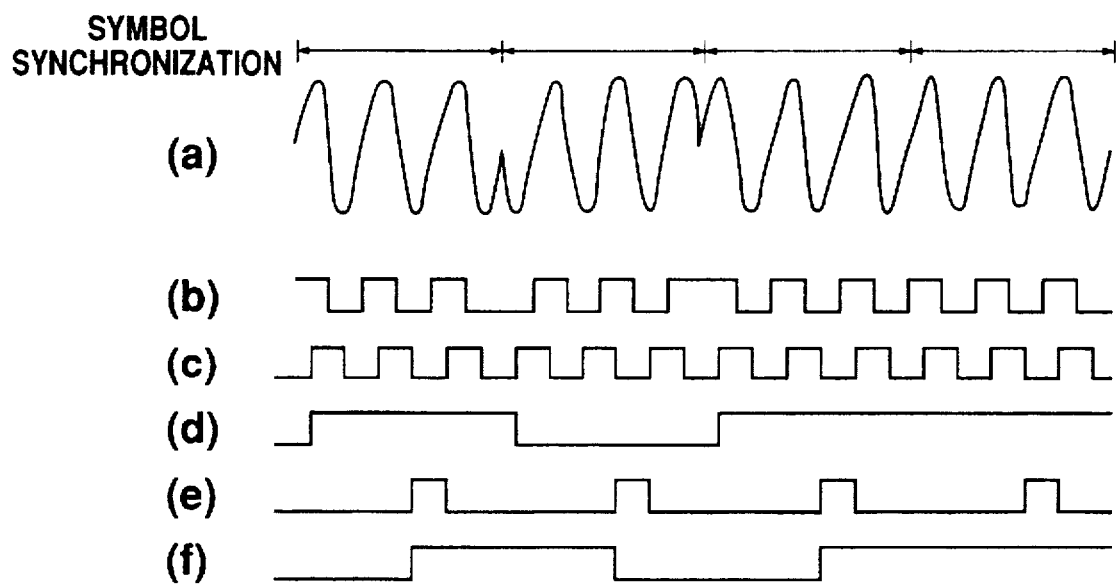
FIG. 2 is a timing chart illustrating the operation of the prior art example.
Figure 3:
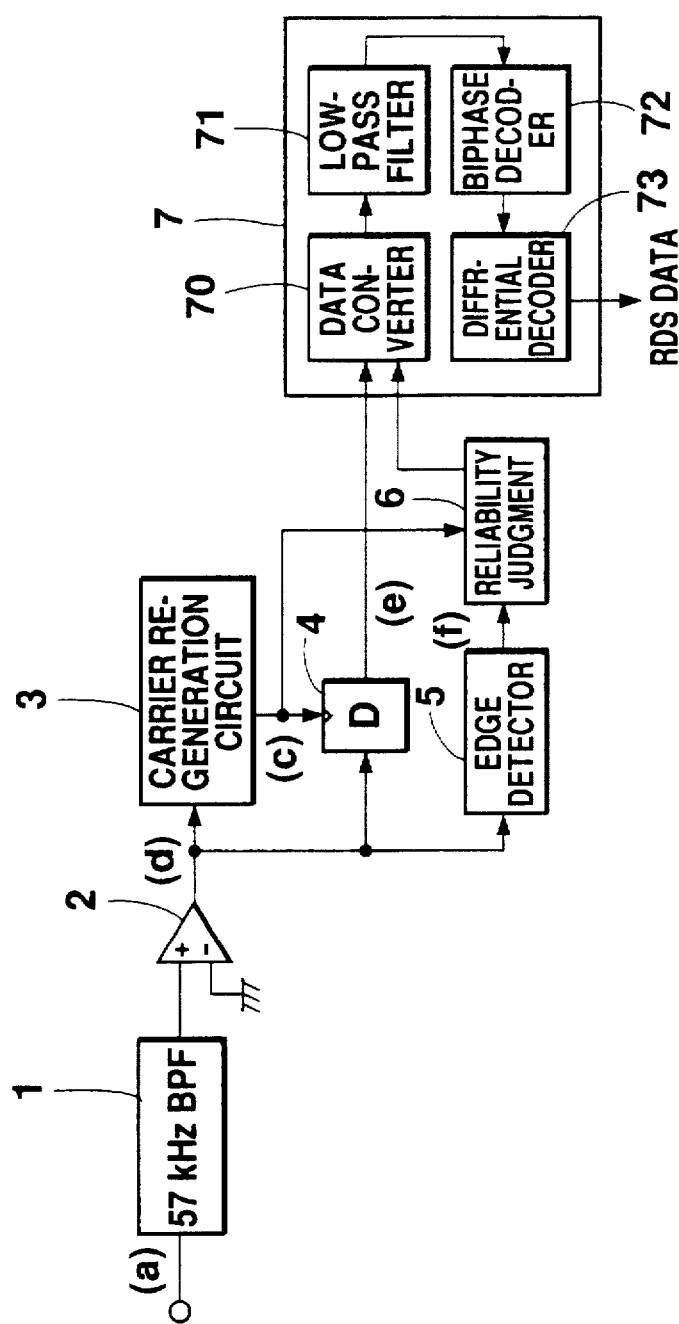
FIG. 3 is a block diagram showing an embodiment of the present invention.

FIG. 3 shows an RDS demodulation apparatus as an embodiment of the present invention.

An FM composite signal multiplexed with RDS signals is input by a 57 kHz BPF circuit 1, and the RDS signals are separated, then input to a comparator 2. A comparator output is supplied to a carrier regeneration circuit 3 comprising a Costas loop for regenerating a 57 kHz carrier, and sampled by a D flip-flop (hereinafter referred to as D-FF) 4 with a 57 kHz regeneration clock regenerated by carrier regeneration circuit 3. The comparator output is supplied to an edge detection circuit 5 and data edges are detected. The edge timing and sampling timing are supplied to a reliability judgment circuit 6, and the deviation between the data edge and the sampling timing is detected.

Figure 4:
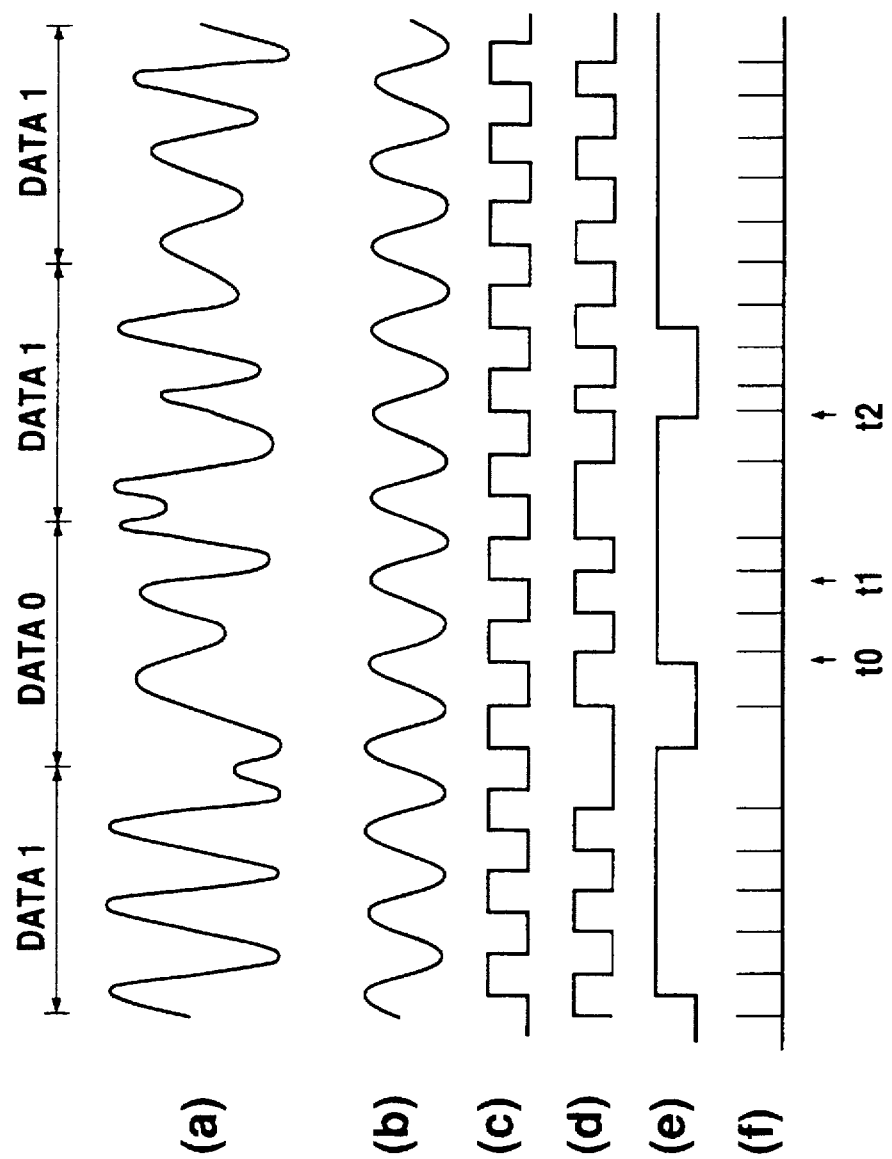
FIG. 4 is a timing chart illustrating the operation of the embodiment of the present invention.

As shown in the waveforms of FIG. 4, an RDS signal shown in FIG. 4 (a) (shown here simply with 3 carriers although an actual RDS signal has 24 carriers per symbol) is output from the BPF 1, and the signal shown in (d) is obtained in the comparator output. The 57 kHz regeneration clock that is regenerated by carrier regeneration circuit 3 is input as a clock input by D-FF 4 at the timing shown in (c) (having a phase of 90 degrees with respect to carrier signal (b)). As a result, the signal shown in (e) is obtained as an output of D-FF 4. On the other hand, the data edges (f) are detected by the edge detection circuit 5 based on the comparator output (d), and the data edges (f) are input together with the regeneration clock (c), which represents the sampling timing, to reliability judgment circuit 6.

At reliability judgment circuit 6, the data edges (f) that were detected by edge detection circuit 5 and the sampling timing, which are the leading edges of regeneration clock (c), are compared, and the edge intervals are encoded and output as reliability data. More concretely, among the data edges existing near the sampling edges, the intervals for the data edges closest to the sampling edges are selected. If the separation of an interval is 4 or more clocks at a system clock of 4 MHz, for example, the reliability of the sampling data is considered to be high and reliability data of 1 is output. If the separation is less than 4 clocks, the reliability of the sampling data is considered to be low and reliability data of 0 is output.

The reliability data and the sampling data (e) from D-FF 4 are input to data regeneration circuit 7 which regenerates biphase symbol data. In a data conversion circuit 70 in the first stage of data regeneration circuit 7, the reliability data is added to the LSB of the sampling data for conversion to 2-bit data. The conversion processing into 2-bit data is performed according to FIG. 5. In this manner, sampling data having high reliability is processed as a level of 3 (binary 11) or 0 (binary 00), and sampling data having low reliability is processed as a level of 1 (binary 01) or 2 (binary 10).

Thereafter, processing is performed at data regeneration circuit 7 using the 2-bit data from the conversion. In other words, in order to first remove the noise components, the 2-bit sampling data from the conversion is input to a low-pass filter 71, which has the symbol rate for the passband, for example, and an integrated result of the sampling data in symbol units is obtained. The filter output is compared with a predetermined threshold value at a biphase decoder 72 and data is output according to the comparison result. For example, the data is judged to be 1 when the filter output is greater than or equal to 2 and the data is judged to be 0 when the filter output is less than or equal to 1. As a result, many of the data signals that have been erroneously sampled, such as due to the influence of noise, are processed as signals of level 1 or 2 so that the influence of the erroneously sampled data on the filter output can be minimized in comparison to the case where reliability data is not added as LSB data. In other words, without the LSB data, the erroneously sampled data will be processed with the same weight (3 or 0) as the correctly sampled data, and the erroneous data will greatly influence the filter output. Even if several sampling data signals are in error due to the influence of noise, as long as several data signals having high reliability are obtained in the symbol period, the desired symbol can be correctly regenerated.

Biphase decoding is performed through differential processing of the various symbol data by biphase decoder 72 and differentially encoded RDS data is output to a differential decoder 73 where differential decoding is further performed and the RDS data is regenerated.

In the description above, the data that is output from reliability judgment circuit 6 was assumed to be 1-bit data, but it is also possible to output multiple-bit reliability data from the interval between the sampling timing and the data edge timing for supply to data regeneration circuit 7. For example, in the case of outputting 2-bit reliability data, it is also possible to perform signal processing at the data regeneration circuit and add reliability data to the LSB according to the rule shown in FIG. 6 to yield 3-bit data. In other words, in a configuration where reliability judgment circuit 6 outputs reliability data having a large value for high reliability, the data regeneration processing is performed by adding the complement of the reliability data (more precisely the one's complement) to the LSB when the sampling data is 0 and by adding the reliability data without change to the LSB when the sampling data is 1. Conversely, as shown in FIG. 7, in a configuration where reliability judgment circuit 6 outputs reliability data having a small value for high reliability, it is preferable to add the reliability data without change to the LSB when the sampling data is 0 and to add the complement of the reliability data to the LSB when the sampling data is 1.

A concrete configuration of the reliability judgment circuit is described next.

Figure 8:
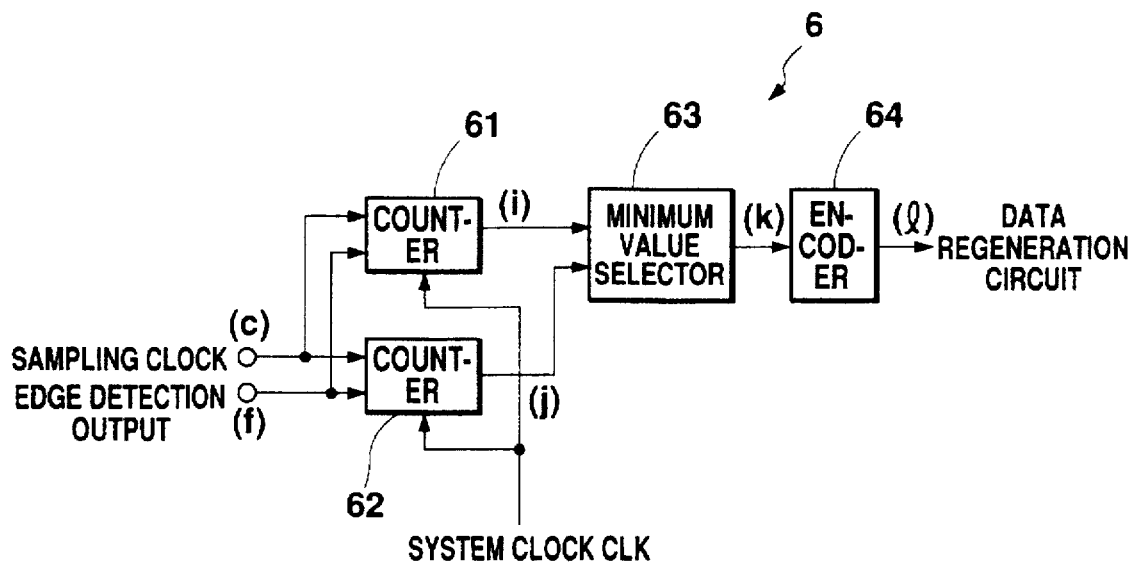
FIG. 8 is a block diagram of a reliability judgment circuit.
Figure 9:
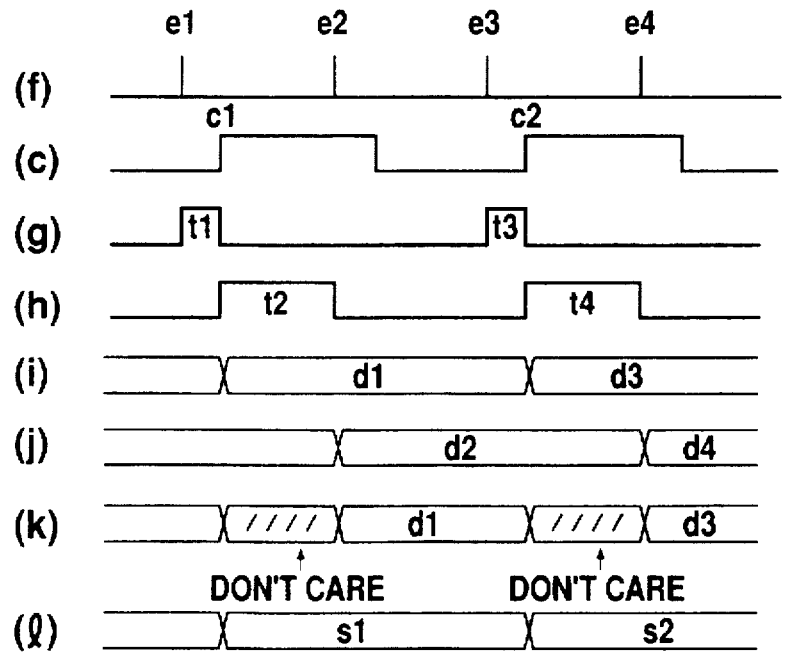
FIG. 9 is a timing chart illustrating the operation of the reliability judgment circuit.

FIG. 8 shows the concrete configuration of the reliability judgment circuit 6 and FIG. 9 shows the timing chart for judgment processing.

First, the edge detection output (f) from edge detection circuit 5 and the regeneration clock (c) for sampling are input to the first and second counters 61, 62, and edge intervals are counted using system clock CLK. Counter 61 detects interval t1 (FIG. 9 (g)) between data edge e1 and sampling edge c1, and interval t3 (FIG. 9 (g)) between data edge e3 and sampling edge c2, and counter 62 detects interval t2 (FIG. 9 (h)) between data edge e2 and sampling edge c1, and interval t4 (FIG. 9 (h)) between data edge e4 and sampling edge c2. The counted results d1 and d3 (FIG. 9 (i)) for periods t1 and t3 and the counted results d2 and d4 (FIG. 9 (j)) for periods t2 and t4 in counters 61, 62 are input by a minimum value selection circuit 63 where the smaller counted results are selected. In this example, d1, which is the counted result for period t1, and d3, which is the counted result for period t3, are selected and then input by an encoder circuit 64 of a later stage. Encoder circuit 64 outputs reliability data of 1 when the output of minimum value selection circuit 63 is greater than or equal to 4 and outputs reliability data of 0 when the output of minimum value selection circuit 63 is less than 4. The reliability data generated in this manner is input together with sampling data S1 and S2 (FIG. 9 (l)), which are the outputs of D-FF 4, to the data regeneration circuit.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. A data demodulation apparatus for demodulating a signal, which is a predetermined carrier wave modulated with digital data, comprising:

a carrier regeneration circuit for regenerating a clock signal that is synchronized with the frequency of said carrier wave;

a sampling circuit for sampling a modulated signal using said regenerated clock signal;

an edge detection circuit for detecting edges of said modulated signal;

a reliability judgment circuit for comparing the edges detected by said edge detection circuit with the edges of said clock signal and outputting reliability data expressing the reliability of said sampling output; and a data regeneration circuit for regenerating said digital data from said reliability data and said sampling output.

2. The data demodulation apparatus according to claim 1 wherein said reliability judgment circuit compares the edges of said clock signal with said detected edges, and encodes the magnitudes of edge intervals of edges for output as said reliability data.

3. The data demodulation apparatus according to claim 2 wherein said reliability judgment circuit selects the closest of said detected edges obtained at timing adjacent to the edge of said clock signal, and encodes the magnitudes of the edge intervals between said selected detected edge and the edge of said clock signal.

4. The data demodulation apparatus according to claim 1 wherein said data regeneration circuit assigns weights to said sampling data in accordance with said reliability data from said reliability judgment circuit, and performs data regeneration processing to assign a large weight to sampling data judged to have high reliability.

5. The data demodulation apparatus according to claim 4 wherein:

said reliability judgment circuit outputs reliability data expressing a large value for high reliability in the weight of said data; and said data regeneration circuit adds said reliability data to the LSB of said sampling data when said sampling data is 1, adds the complement of said reliability data to the LSB of said sampling data when said sampling data is 0, and performs regeneration of data based on sampling data added with said data.

6. The data demodulation apparatus according to claim 4 wherein:

said reliability judgment circuit outputs reliability data expressing a small value for high reliability in the weight of said data; and said data regeneration circuit adds the complement of said reliability data to the LSB of said sampling data when said sampling data is 1, adds said reliability data to the LSB of said sampling data when said sampling data is 0, and performs regeneration of data based on sampling data added with said data.

* * * * *